US012561320B2

(12) United States Patent
Krismayer et al.

(10) Patent No.: US 12,561,320 B2
(45) Date of Patent: Feb. 24, 2026

(54) IDENTIFICATION OF PRIMARY AND FOREIGN KEYS

(71) Applicant: Dynatrace LLC, Waltham, MA (US)

(72) Inventors: Thomas Krismayer, Urfahr-Umgebung (AT); Otmar Ertl, Linz (AT)

(73) Assignee: Dynatrace LLC, Boston, MA (US)

( * ) Notice: Subject to any disclaimer, the term of this patent is extended or adjusted under 35 U.S.C. 154(b) by 0 days.

(21) Appl. No.: 18/938,570

(22) Filed: Nov. 6, 2024

(65) Prior Publication Data

US 2025/0156416 A1 May 15, 2025

Related U.S. Application Data

(60) Provisional application No. 63/599,008, filed on Nov. 15, 2023.

(51) Int. Cl.
*G06F 16/24* (2019.01)
*G06F 16/22* (2019.01)
*G06F 16/2453* (2019.01)

(52) U.S. Cl.
CPC ...... *G06F 16/24537* (2019.01); *G06F 16/221* (2019.01)

(58) Field of Classification Search
CPC .................................................. G06F 16/24537
USPC ......................................................... 707/791
See application file for complete search history.

(56) References Cited

U.S. PATENT DOCUMENTS

| | | | |
|---|---|---|---|
| 10,824,592 B2 | 11/2020 | Nazi et al. | |
| 2011/0208748 A1* | 8/2011 | Chaudhuri | G06F 16/217 |
| | | | 707/748 |
| 2016/0055205 A1* | 2/2016 | Jonathan | G06F 16/2456 |
| | | | 707/714 |
| 2024/0427768 A1* | 12/2024 | Kamali | G06F 16/2456 |

OTHER PUBLICATIONS

Azade Nazi et al., "Efficient Estimation of Inclusion Coefficient using Hyper:pgLog Sketches." Proceedings of the VLDB Endowment, vol. 11, No. 10 Jun. 2018.

* cited by examiner

*Primary Examiner* — Syling Yen
(74) *Attorney, Agent, or Firm* — Harness, Dickey & Pierce, P.L.C.

(57) ABSTRACT

A computer-implemented method is presented for determining primary keys in a table of a database system. The method includes: determining a number of rows in the table; for a given column of the table, generating a probabilistic data structure for the given column, where the probabilistic data structure is partitioned into a plurality of registers and configuration parameters for the probabilistic data structure includes a first recording parameter, base, that controls recording of data into the probabilistic data structure; computing a cardinality estimate for the given column using the probabilistic data structure; computing a ratio between the cardinality estimate for the given column and the number of rows in the table; comparing the ratio to a threshold; and designating the given column as a primary key for the table in response to the ratio being greater than the threshold.

12 Claims, 5 Drawing Sheets

Figure 1:
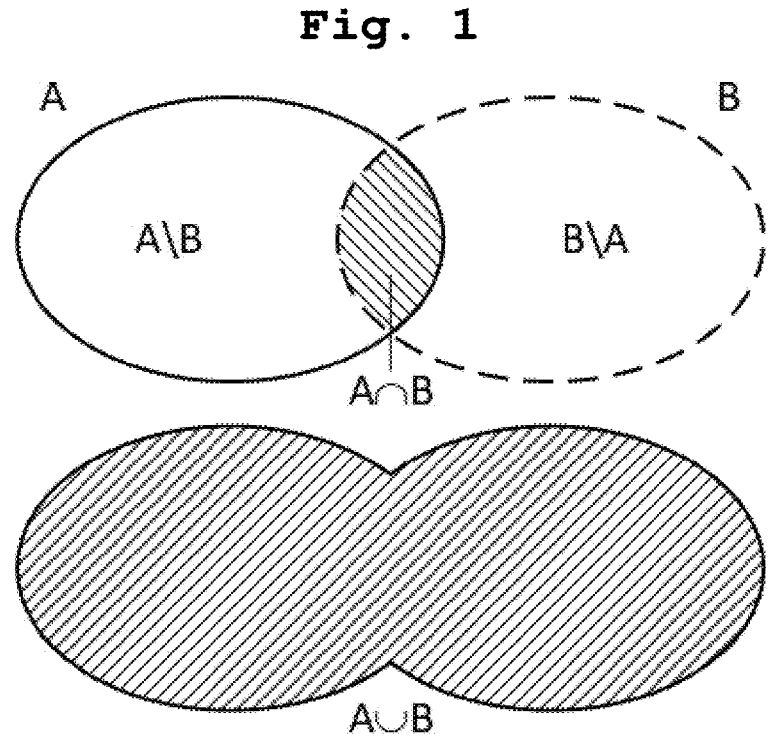

SELECT *
FROM A, B
WHERE
A.C1

SELECT *
FROM A, B
WHERE
A.C1 = B.C1

SELECT *

FROM A, B

WHERE

A.C1 = B.

SELECT *
FROM keyword AS k,
movie_keyword AS mk
WHERE
k.

SELECT *
FROM keyword AS k,
movie_keyword AS mk
WHERE
k.id = mk.id
movie_id
keyword_id SELECT *
FROM keyword AS k,
movie_keyword AS mk
WHERE

| k.id = mk. | id | id |
| --- | --- | --- |
| | movie_id | movie_id |
| | keyword_id | keyword_id |

IDENTIFICATION OF PRIMARY AND FOREIGN KEYS

CROSS-REFERENCE TO RELATED APPLICATIONS

This application claims the benefit and priority of U.S. Provisional Application No. 63/599,008 filed on Nov. 15, 2023. The entire disclosure of the above application is incorporated herein by reference.

FIELD

The disclosure concerns the technical field of information technology. In particular, the disclosure concerns the identification of primary and foreign keys in data, in particular in data tables on a database system. Knowing which column/columns in a table are considered to be primary keys and/or which column/columns in a second table are considered to be foreign keys relative to a column in a first table is important for the formulation of join queries joining two tables with each other. In case primary or foreign keys are not a priori known, the identification of these keys helps users to formulate spot-on join queries. While the disclosure is applicable to all database systems, it is particularly useful for big data applications, where a priori knowledge of primary or foreign keys is not available.

BACKGROUND

In the art, different approaches are known for the identification of primary and foreign keys, such as utilizing 1) sketching algorithms, especially HyperLogLog and variants of it, such as UltraLogLog, or Bottom-k and variants of it, such as Theta sketch; 2) machine learning approaches; 3) manual definition of keys, for example via configuration files or naming conventions for tables; and 4) checking the complete data for duplicates or checking the content of the foreign key candidate against the content of the primary key candidate.

One example of an approach based on HyperLogLog sketches can be found in the paper Azade Nazi et al., Efficient Estimation of Inclusion Coefficient using Hyper-LogLog Sketches, Proceedings of the VLDB Endowment, Vol. 11, No. 10, 2018, Rio de Janeiro, Brazil. An approach based on the Bottom-k method is described in the paper Meihui Zhang et al., On MultiColumn Foreign Key Discovery, Proceedings of the VLDB Endowment, Vol. 3, No. 1, 2010, Singapore. Finally, an approach based on machine learning is described in the paper Alexandra Rostin et al., A Machine Learning Approach to Foreign Key Discovery, Proceedings of the 12th International Workshop on the Web and Databases, 2009, Providence, USA.

While some approaches work well for either primary or foreign key detection, no approach is known that is computationally efficient and allows the identification of both primary and foreign keys.

In the paper Otmar Ertl. SetSketch: Filling the Gap between MinHash and HyperLogLog. PVLDB, 14(11): 2244-2257, 2021, the SetSketch probabilistic data structure is introduced and some of its characteristics are outlined.

This section provides background information related to the present disclosure which is not necessarily prior art.

SUMMARY

This section provides a general summary of the disclosure, and is not a comprehensive disclosure of its full scope or all of its features.

The objective of the disclosure is to find computationally efficient methods for the determination of primary keys and foreign keys. Due to its efficiency, the methods shall be well suited for large amounts of data, such as big data applications.

The technical problem is solved by the subject matter of claim 1 directed to a computer-implemented method for determining primary keys in a table of a database system. Advantageous embodiments are subject of the dependent claims.

The computer-implemented method for determining primary keys in a table of a database system, comprises:

determining, by a computer processor, a number of rows in the table;

for a given column of the table, generating, by the computer processor, a probabilistic data structure for the given column, where the probabilistic data structure is partitioned into a plurality of registers and configuration parameters for the probabilistic data structure includes a first recording parameter, base, that controls recording of data into the probabilistic data structure;

computing, by the computer processor, a cardinality estimate for the given column using the probabilistic data structure;

computing, by the computer processor, a ratio between the cardinality estimate for the given column and the number of rows in the table;

comparing, by the computer processor, the ratio to a threshold; and designating the given column as a primary key for the table in response to the ratio being greater than the threshold.

According to a preferred embodiment, the probabilistic data structure is updated in accordance with the first recording parameter, base, and a second recording parameter, rate, such that changing a value of the first recording parameter and changing the number of registers sets the maximum number of distinct data elements that can be represented by the probabilistic data structure. The first recording parameter, base, mainly effects the accuracy of the cardinality estimate. The combination of base and the number of registers set the maximum number of distinct data elements that can be represented by the probabilistic data structure.

Typically, base is greater than one and less than or equal to two, i.e. $2 \geq \text{base} > 1$.

According to a preferred embodiment, the probabilistic data structure is a SetSketch data structure. SetSketch data structures are computationally efficient to generate and allow the efficient computation of cardinality estimates, similarity measurements, such as the Jaccard similarity, the determination of unions etc. In addition, SetSketches consume very little memory. Lastly, the accuracy of the SetSketches is known beforehand based on the design parameters of the sketch.

In order to determine all primary key candidates in the table, it is preferred to repeat the steps of claim 1 for multiple, preferable all, columns of the table.

The cardinality estimate for the given column can be computed using the inclusion-exclusion principle.

According to another preferred embodiment, the primary keys determined by the method according to claim 1 are used in a computer-implemented method for joining tables in a database system, comprising the steps: —receiving, by a computer processor, an indicator for a first table to be joined; —determining, by the computer processor, a given column of the first table as a primary key according to claim 1; —receiving, by the computer processor, a join operation for joining the first table with a second table in the database system, where the join operation is based on the given column from the first table; and —joining, by the computer processor, the first table with the second table according to the join operation.

According to a very preferred embodiment, the method comprises determining foreign keys in the second table relative to the given column designated in the first table of a database system, in order to join the first table with the second table.

Without limitation, the join operation can be a hash join or a sort merge join.

The determination of foreign keys in the second table comprises the steps: —for a first column of the second table, generating, by the computer processor, another probabilistic data structure for the first column, where the another probabilistic data structure is partitioned into a plurality of registers and configuration parameters for the another probabilistic data structure includes a first recording parameter, base, that controls recording of data into the another probabilistic data structure; —computing, by the computer processor, a cardinality estimate for the first column using the another probabilistic data structure; —computing, by the computer processor, an inclusion coefficient between the first column of the second table relative to the given column of the first table based in part on the cardinality estimate for the first column; —comparing, by the computer processor, the inclusion coefficient to a threshold; and —designating the first column of the second table as a foreign key in response to the inclusion coefficient being greater than the threshold.

The objective technical problem is also solved by a computer-implemented method for determining foreign keys in a second table relative to a given column designates as a primary key in a first table of a database system, comprising the steps:

generating, by the computer processor, a first probabilistic data structure for the given column, where the first probabilistic data structure is partitioned into a plurality of registers and configuration parameters for the first probabilistic data structure includes a first recording parameter, base, that controls recording of data into the first probabilistic data structure;

for a first column of the second table, generating, by the computer processor, another probabilistic data structure, where the another probabilistic data structure is partitioned into a plurality of registers and configuration parameters for the another probabilistic data structure includes another recording parameter, base, that controls recording of data into the another probabilistic data structure;

computing, by the computer processor, a cardinality estimate for the first column using the another probabilistic data structure;

computing, by the computer processor, an inclusion coefficient for the first column of the second table in relation to the given column of the first table based in part on the cardinality estimate for the first column;

comparing, by the computer processor, the inclusion coefficient to a threshold; and designating the first column of the second table as a foreign key in response to the inclusion coefficient being greater than the threshold.

According to a preferred embodiment, also the other probabilistic data structure is updated in accordance with the first recording parameter and a second recording parameter, rate, such that changing a value of the first recording parameter and changing the number of registers sets the maximum number of distinct data elements that can be represented by the other probabilistic data structure.

Very preferably, also the another probabilistic data structure is a SetSketch probabilistic data structure.

In order to determine foreign keys in multiple columns of the second table, it is preferred to repeat the steps for multiple columns, preferably all, columns of the second table.

According to one variant, the method comprises computing, by the computer processor, a cardinality estimate for the given column using the first probabilistic data structure, wherein the inclusion coefficient is defined as $\Phi(B.C_j, A.C_i)=(|B.C_j|+|A.C_1|)J/|B.C_j|(1+J)$, where $|B.C_j|$ is the cardinality estimate for the first column of the second table, $|A.C_1|$ is the cardinality of the given column of the first table, and J is Jaccard similarity between the first column of the second table and the given column of the first table.

According to another variant, the method comprises computing the inclusion coefficient defined as $$\Phi(B.C_j, A.C_i) = \frac{|B.C_j \cap A.C_i|}{|B.C_j|},$$

where the cardinality of the intersection between $B.C_j$ and $A.C_1$, $|B.C_j \cap A.C_1|$, is calculated using the inclusion-exclusion principle.

The determination of foreign keys comprises the steps:

computing, by the computer processor, an inclusion coefficient for the given column of the first table in relation to the first column of the second table based in part on the cardinality estimate for the first column; —comparing, by the computer processor, the inclusion coefficient to a threshold; and designating the given column of the first table as a foreign key in response to the inclusion coefficient being greater than the threshold.

It is advantageous to use SetSketch probabilistic data structures instead of other probabilistic data structures, such as MinHash, UltraLogLog or HyperLogLog, since SetSketch data structures have a lower memory footprint (typically 16-bit registers for buckets are sufficient instead of 32- or even 64-bit registers as used in other sketches). In addition, SetSketch data structures can be drawn up quicker and cardinality estimates and similarities can be calculated very efficiently.

The objective technical problem is also solved by a computer-implemented method for formulating a join operation in a database system, comprising: —receiving, by a computer processor, an indicator for a first table to be joined; —determining, by the computer processor, a given column of the first table as a primary key by determining, by a computer processor, a number of rows in the table; —for a given column of the table, generating, by the computer processor, a probabilistic data structure for the given column; —computing, by the computer processor, a cardinality estimate for the given column using the probabilistic data structure; —computing, by the computer processor, a ratio between the cardinality estimate for the given column and the number of rows in the table; —comparing, by the computer processor, the ratio to a threshold; —designating the given column as a primary key for the table in response to the ratio being greater than the threshold; —determining, by the computer processor, foreign keys in a second table relative to the given column designated in the first table, where the determination is based in part on the probabilistic data structure; —receiving, by the computer processor, a join operation for joining the first table with the second table in the database system using the foreign keys; and —joining, by the computer processor, the first table with the second table according to the join operation.

Also in this case, it is preferable that the probabilistic data structure is SetSketch data structure.

The aforementioned method comprises preferably both i) determining foreign keys in the second table relative to the given column in the first table by for a first column of the second table, generating, by the computer processor, another probabilistic data structure for the first column, where the another probabilistic data structure is partitioned into a plurality of registers and configuration parameters for the another probabilistic data structure includes a first recording parameter that controls recording of data into the another probabilistic data structure;

computing, by the computer processor, a cardinality estimate for the first column using the another probabilistic data structure;

computing, by the computer processor, an inclusion coefficient between the first column of the second table relative to the given column of the first table based in part on the cardinality estimate for the first column;

comparing, by the computer processor, the inclusion coefficient to a threshold; and designating the first column of the second table as a foreign key in response to the inclusion coefficient being greater than the threshold, as well as ii) determining foreign keys in the first table relative to the first column in the second table by computing, by the computer processor, an inclusion coefficient between the given column of the first table relative to the first column of the second table based in part on the cardinality estimate for the first column and the cardinality estimate for the given column;

comparing, by the computer processor, the inclusion coefficient to a threshold; and designating the given column of the first table as a foreign key in response to the inclusion coefficient being greater than the threshold.

By computing not just a first inclusion coefficient between a first column or multiple columns of the second table relative to the given column of the first table but also by computing a second inclusion coefficient between a given column or multiple columns of the first table relative to the first column of the second table, join operations involving the equality operator for comparing the fields of two tables can be treated efficiently. The first inclusion coefficient identifies whether a column of the second table is a foreign key relative to the given column of the first table, whereas the second inclusion coefficient identifies whether the given column of the first table is a foreign key relative to a column of the second table. Both inclusion coefficients are computed and the result output to the user or the application calling the method.

Further areas of applicability will become apparent from the description provided herein. The description and specific examples in this summary are intended for purposes of illustration only and are not intended to limit the scope of the present disclosure.

DRAWINGS

Figure 4:
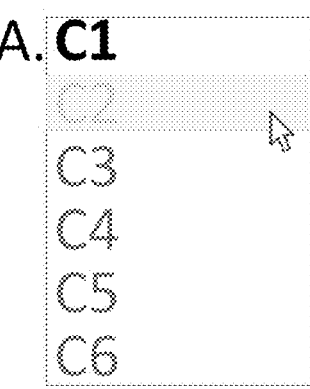
Figure 5:
Figure 2:
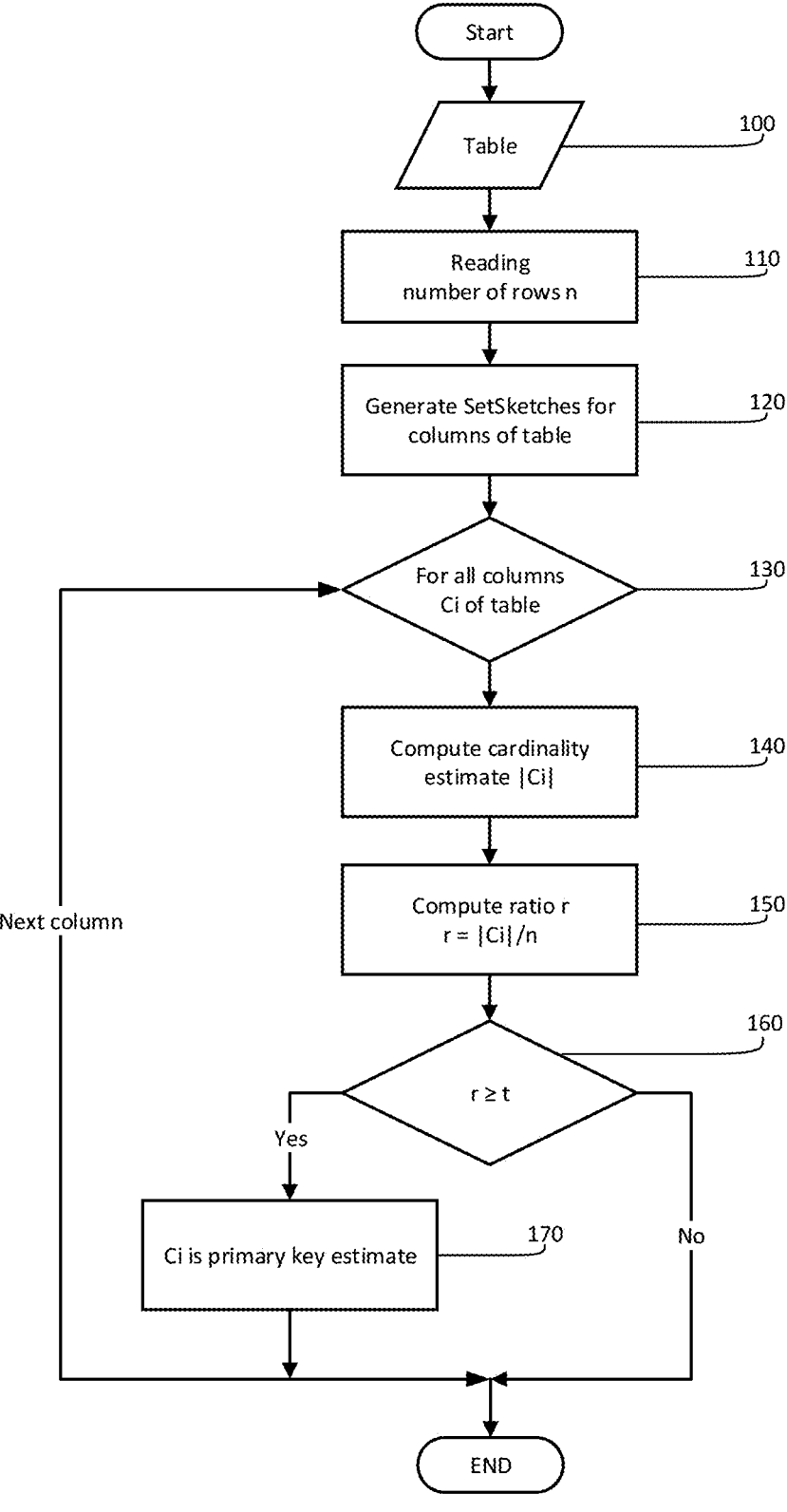
Figure 3:
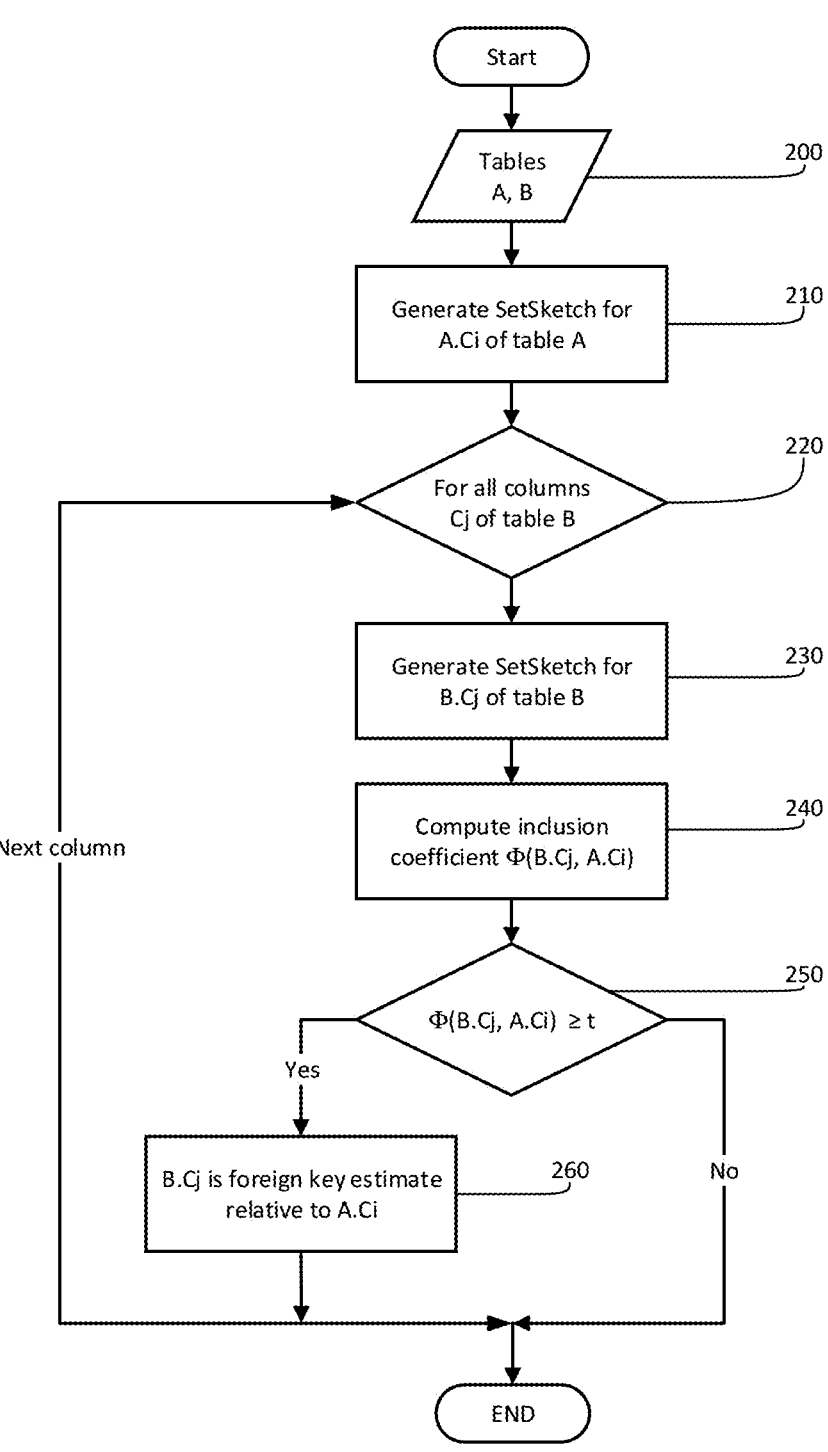
Figure 6:
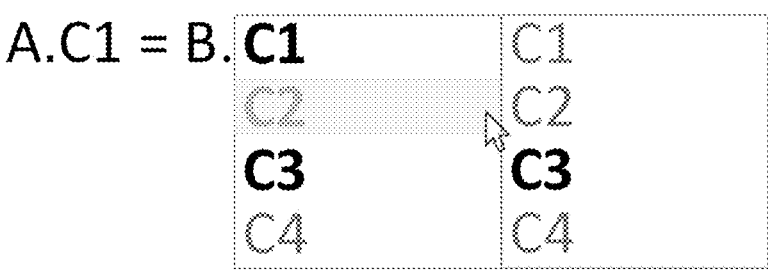
Figure 7:
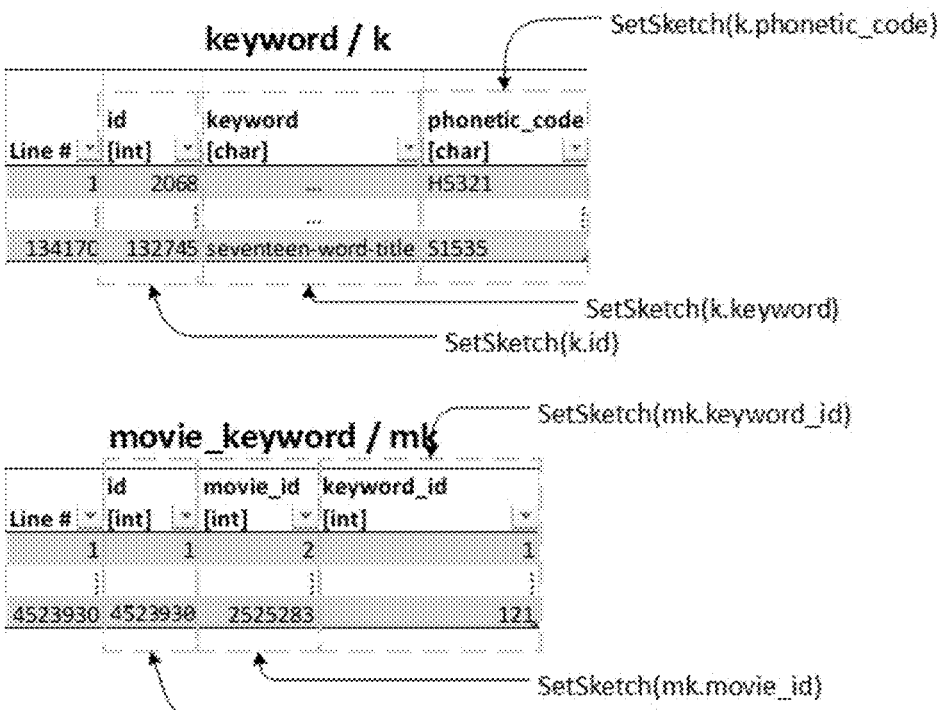
Figures 8, 9, 10:
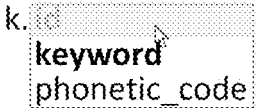

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein:

FIG. 1 shows a schematic of two sets A and B, the intersection A∩B, the union A∪B as well as the differences between sets A and B, FIG. 2 shows an overview of the disclosed method for the determination of primary key estimates, FIG. 3 shows an overview of the disclosed method for the determination of foreign key estimates, FIGS. 4-6 show intermediate steps in the definition of a join condition for the tables A and B on a database system involving the determination of primary and foreign key estimates, FIG. 7 shows the structure of two tables of the IMDB dataset, FIGS. 8-10 show intermediate steps in the definition of a join condition for tables comprised in the IMDB dataset on a database system involving the determination of primary and foreign key estimates.

Corresponding reference numerals indicate corresponding parts throughout the several views of the drawings.

DETAILED DESCRIPTION

Example embodiments will now be described more fully with reference to the accompanying drawings.

The main steps in the computer-implemented method for detecting primary key estimates for a table are shown in FIG. 2. After starting the method, in step 110 the number of rows n of the table 100 is read in. In step 120, SetSketch probabilistic data structures are prepared for all columns of the table. In step 130, a loop across all columns of the table is started. In step 140, based on the SetSketch data structure for the table Ci, the cardinality estimate |Ci| for the column Ci is calculated. In step 150, the ratio r between the cardinality estimate |Ci| for column Ci and the number of rows n of the table is computed. If the ratio r is greater or equal to a threshold value t then column Ci is considered to be a primary key estimate and in step 170 the method customer is informed about it. Otherwise, Ci is not considered to be a primary key estimate. The loop is continued with the next column until all columns of the table are covered.

The main steps in the computer-implemented method for detecting foreign key estimates are shown in FIG. 3. After starting the method, in step 210 a SetSketch probabilistic data structure is generated for the column A.Ci of a first table A. In step 220, a loop across all columns Cj of a second table B s is started. In step 230, a SetSketch probabilistic data structure is generated for the column B.Cj of the second table B. In step 240, based on the SetSketch data structures for A.Ci and B.Cj an inclusion coefficient $\Phi(B.C_j, A.C_i)$ is calculated. Step 250 checks whether the inclusion coefficient is greater or equal to a threshold value t. If $\Phi(B.C_j, A.C_i) \geq t$ then the column B.Cj of the second table B is considered to be a foreign key estimate relative to the column A.Ci of the first table A. Otherwise, B.Cj is not considered to be a foreign key estimate. The loop is continued with the next column until all columns of the second table are covered.

According to a variant of the method for foreign key detection, in addition to the first inclusion coefficient $\Phi(B.C_j, A.C_i)$, a second inclusion coefficient $\Phi(A.C_i, B.C_j)$ is computed. The first inclusion coefficient is decisive if B.Cj is a foreign key estimate relative to A.Ci, whereas the second inclusion coefficient is decisive if A.Ci is a foreign key estimate relative to B.Cj. So in the first case, the column B.Cj is considered to be a foreign key estimate relative to A.Ci if $\Phi(B.C_j, A.C_i) \geq t$, whereas in the second case, the column A.Ci is considered to be a foreign key estimate relative to B.Cj if $\Phi(A.C_i, B.C_j) \geq t$. This variant of the method is advantageous if a join condition comprises the equality sign between two distinct columns.

The basic idea for the detection of primary key candidates and primary key estimates will be explained in a first application example. Assuming a short table A (see Tab. 1) having 12 rows and 6 columns, the task is to find the columns of the table A that are primary keys candidates. In the disclosure we distinguish between primary key candidates and primary key estimates. Primary key estimates are well defined estimates for primary key candidates based on a probabilistic data structure, such as a SetSketch. Contrary to a primary key estimate, a primary key candidate is based on data in a table itself, and does not involve estimates, such as a probabilistic data structure, e.g. a SetSketch, representing data or properties of the data.

TABLE A

Tab. 1 Table A

| Index | C1 | C2 | C3 | C4 | C5 | C6 |
|-------|-----|-----|-----|-----|-----|-----|
| 1 | 1 | 1 | 1 | 1 | 1 | 1 |
| 2 | 2 | 2 | 2 | 2 | 2 | 1 |
| 3 | 3 | 3 | 3 | 3 | 1 | 1 |
| 4 | 4 | 4 | 4 | 1 | 2 | 1 |
| 5 | 5 | 5 | 1 | 2 | 1 | 1 |
| 6 | 6 | 6 | 2 | 3 | 2 | 1 |
| 7 | 7 | 1 | 3 | 1 | 1 | 1 |
| 8 | 8 | 2 | 4 | 2 | 2 | 1 |
| 9 | 9 | 3 | 1 | 3 | 1 | 1 |
| 10 | 10 | 4 | 2 | 1 | 2 | 1 |
| 11 | 11 | 5 | 3 | 2 | 1 | 1 |
| 12 | 12 | 6 | 4 | 3 | 2 | 1 |

In the following paragraphs, table A will be analyzed, and primary key candidates based on the data in the table will be determined. Subsequently, primary key estimates will be detected based on SetSketch probabilistic data structures representing the data in the table.

The cardinality of a column is determined by counting the distinct elements in the column. E.g. in column 1 of table A, short A.C1, all 12 elements {1, 2, 3, 4, 5, 6, 7, 8, 9, 10, 11, 12} are distinct from each other, hence the cardinality of the first column C1 of table A is 12, i.e. $|A.C_1|=12$. Contrary to this, e.g. column 4 of table A contains just 3 distinct elements, which are the integer values {1, 2, 3}. Hence, the cardinality of column 4 of table A is 3, i.e. $|A.C_4|=3$. The real cardinalities of the columns of table A are given in Tab. 2 as follows:

Tab. 2 Real cardinalities for columns of table A

| Column | Formula for cardinality | Cardinality (real) | Ratio r |
|--------|-------------------------|--------------------|---------|
| A.C$_1$ | \|A.C$_1$\| | 12 | 1 |
| A.C$_2$ | \|A.C$_2$\| | 6 | 0.5 |
| A.C$_3$ | \|A.C$_3$\| | 4 | 0.33 |
| A.C$_4$ | \|A.C$_4$\| | 3 | 0.25 |
| A.C$_5$ | \|A.C$_5$\| | 2 | 0.17 |
| A.C$_6$ | \|A.C$_6$\| | 1 | 0.08 |

As noted above, table A has 12 rows, i.e. n=12. Hence, the ratio r between the cardinality of column A.C1 and the number of rows n is 1. Further values for the other columns are given in the last column of Tab. 2.

Assuming a threshold t=0.9 for the determination of primary key candidates, A.C1 is a primary key candidate as $$r = \frac{|A.C1|}{n} = 1 \geq t.$$

The other columns of table A are not considered to be primary key candidates.

While the described procedure works well for short tables, it is cumbersome for large tables comprising thousands or millions of entries. Instead of accurately establishing the real cardinality by counting distinct elements, the cardinality of a column can be estimated based on a SetSketch probabilistic data structure for the column. So instead of counting distinct elements in the respective columns, cardinality estimates can be calculated based on SetSketch probabilistic data structure for the columns of the table.

As noted above, SetSketch probabilistic data structures as well as some of its characteristics are known from the paper Otmar Ertl. "SetSketch: Filling the Gap between MinHash and HyperLogLog". PVLDB, 14(11): 2244-2257, 2021. A public repository containing source code is available at https://github.com/dynatrace-research/set-sketch-paper The Java code for the method createFromBulk for generating a new SetSketch probabilistic data structure, the method merge for merging two SetSketches, the method cardinality for calculating a cardinality estimate, and the method calculateSimilarity for calculating the Jaccard similarity between two SetSketches are given below:

```
public void addHash(long hashValue) {
    rnd.reset(hashValue);
    permutationGenerator.reset( );
    boolean minValOverwritten = false;
    double xj = 0d;
    double maxX = Math.pow(base, −1d * minRegisterVal);
    for (int j = numRegisters; j > 0; j—) {
        xj += (rnd.nextExponential( ) / rate) / j;
        if (xj > maxX) {
            break;
        }
        int kj = Math.max (0, Math.min(registerMaxValue,
(int) Math.floor(1 − logB(xj))));
        if (kj <= minRegisterVal) {
            break;
        }
        int index = permutationGenerator.next(rnd);
        int currentVal = registers.getRegister(index);
        if (kj > currentVal) {
            registers.setRegister(index, kj);
            if (currentVal == minRegisterVal) {
                minValOverwritten = true;
            }
        }
    }
    if (minValOverwritten) {
        updateInternal( );
    }
}
int estimateMinRegisterVal(int n) {
    return (int) Math.floor((Math.log(n * rate * base) −
Math.log(−Math.log(THRESHOLD_ESTIMATION_ERROR /
numRegisters))) / logBase);
}
public static SetSketch createFromBulk(SetSketch sketch,
int[ ] values) {
    sketch.reset( );
```

-continued

```
    if (values.length == 0) {
        return sketch;
    }
    sketch.minRegisterVal =
sketch.estimateMinRegisterVal(values.length);
    for (int val : values) {
        sketch.addHash(SketchUtil.getHash(val));
    }
    int min = sketch.findMinRegisterVal( );
    if (min < sketch.minRegisterVal) {
        sketch.minRegisterVal = min;
        for (int val : values) {
            sketch.addHash(SketchUtil.getHash(val));
        }
    } else {
        sketch.minRegisterVal = min;
    }
    return sketch;
}
public long cardinality( ) {
    double sum = 0;
    for (int i = 0; i < numRegisters; i++) {
        sum += Math.pow(base, −1d *
registers.getRegister(i));
    }
    double div = rate * logBase * sum;
    return div == 0 ? 0 : Math.round(numRegisters * (1 −
(1 / base)) / div);
}
public static SetSketch merge(SetSketch a, SetSketch b) {
    if (hasDifferentStructure(a, b)) {
        return null;
    }
    SetSketch result = a.deepCopy( );
    for (int i = 0; i < a.numRegisters; i++) {
        int val = b.registers.getRegister(i);
        if (result.registers.getRegister(i) < val) {
            result.registers.setRegister(i, val);
        }
    }
    result.minRegisterVal = result.findMinRegisterVal( );
    return result;
}
public double calculateSimilarity(SetSketch other) {
    if (hasDifferentStructure(this, other)) {
        return −1;
    }
    long size = cardinality( );
    long sizeOther = other.cardinality( );
    if (size == 0 || sizeOther == 0) {
        return 0;
    }
    int dPlus = 0;
    int dMinus = 0;
    int d0 = 0;
    for (int i = 0; i < numRegisters; i++) {
        if (this.registers.getRegister(i) <
other.registers.getRegister(i)) {
            dMinus++;
        } else if (this.registers.getRegister(i) >
other.registers.getRegister(i)) {
            dPlus++;
        } else {
            d0++;
        }
    }
    double u = 1.0 * size / (size + sizeOther);
    double v = 1.0 * sizeOther / (size + sizeOther);
    return similarity(dPlus, dMinus, d0, u, v);
}
private double similarity(int dPlus, int dMinus, int d0,
double u, double v) {
    double bk = Math.nextAfter(Math.min(u / v, v / u), 0);
    UnivariateObjectiveFunction f = new
UnivariateObjectiveFunction (x −> logLJ(u, v, dPlus,
dMinus, d0, x));
    // set the initial guess for the value to the maximum
    // (third parameter for SearchInterval), because the
    // algorithm will otherwise not check corner case
```

-continued

```
    UnivariatePointValuePair result = optimizer.optimize(f,
    new SearchInterval(0, bk, bk / 2), new MaxIter(100),
        new MaxEval(200), GoalType.MAXIMIZE);
    return result.getPoint( );
}
```

The code for generating a new SetSketch for C1 of table A, for estimating its cardinality, for calculating the ratio r and for outputting a message if r≥t is given below:

```
public static void main(String[ ] args) {
    // Defining the columns of table A
    int[ ] AC1 = new int[ ]{1, 2, 3, 4, 5, 6, 7, 8, 9, 10, 11,
    12};
    // Number of rows (length of array)
    int n = AC1.length;
    // Cardinality estimate
    long cardAC1;
    // Ratio r
    float rAC1;
    // Threshold t for primary key candidate
    float t = 0.9f;
    // Creating SetSketches for column A.C1 of table A
    SetSketch sketchAC1 = SetSketch.createFromBulk(AC1);
    // Cardinality of SetSketches sketchA1
    cardAC1 = sketchAC1.cardinality( );
    // Ratio r between cardinalities and n
    rAC1 = cardAC1/(float) n;
    System.out.println("|A.C1|: " + cardAC1);
    System.out.format("Ratio r for A.C1: %f%n", rAC1);
    if (rAC1 >= t)
        System.out.println("A.C1 is a primary key candidate!");
}
```

Executing the above for all columns of table A and generating SetSketches using standard parameters having 4096 registers, a base of 1.001, and a rate of 20 yields the cardinality estimates and the ratios r given in Tab. 3.

Tab. 3 Cardinality estimates and rations r for columns of table A

| Column | Formula for Cardinality | Cardinality (estimate) | Ratio r |
|--------|------------------------|------------------------|---------|
| $A.C_1$ | $|A.C_1|$ | 12 | 1 |
| $A.C_2$ | $|A.C_2|$ | 6 | 0.5 |
| $A.C_3$ | $|A.C_3|$ | 4 | 0.33 |
| $A.C_4$ | $|A.C_4|$ | 3 | 0.25 |
| $A.C_5$ | $|A.C_5|$ | 2 | 0.17 |
| $A.C_6$ | $|A.C_6|$ | 1 | 0.08 |

E.g. assuming a threshold t of 0.9, column C1 of table A is a primary key estimate since r≥t, whereas the other columns cannot be considered primary key estimates. Comparing Tab. 3 to Tab. 2 yields that the detected primary key estimates are identical to the primary key candidates of table A. Hence, it can be concluded that SetSketches estimate the cardinality of tables well and can be used to detect primary key estimates.

Although the code above is written in Java, the disclosure is not limited to Java as the methods can be performed in any language.

In a second application example, the steps for detecting foreign key candidates and foreign key estimates will be demonstrated. In addition to table A as defined above, a simple table B will be used (see Tab. 4 below).

TABLE B

| Tab. 4 Table B | | | | |
| --- | --- | --- | --- | --- |
| Index | C1 | C2 | C3 | C4 |
| 1 | 1 | 1 | 1 | 1 |
| 2 | 1 | 2 | 2 | 13 |
| 3 | 1 | 3 | 3 | 14 |
| 4 | 1 | 4 | 4 | 15 |
| 5 | 1 | 5 | 5 | 16 |
| 6 | 1 | 6 | 6 | 1 |
| 7 | 1 | 1 | 7 | 18 |
| 8 | 1 | 2 | 8 | 19 |
| 9 | 1 | 3 | 9 | 20 |
| 10 | 1 | 4 | 10 | 21 |
| 11 | 1 | 5 | 11 | 1 |
| 12 | 1 | 6 | 12 | 23 |

The basic idea for the detection of foreign key candidates will be described first. FIG. 1 shows the set relations of two sets of attribute values A and B that are relevant for foreign key detection. If set B is a foreign key candidate referring to set A then all values of B must be included in the values of A. Therefore, B\A (i.e., the set of values that are part of B and not part of A) must be empty and A ∪ B (the set that includes all values that appear in A or B or both) must be equal to the set of values included in A.

While the above criterion must be fulfilled for B to be a foreign key candidate for A, other criteria can be applied to increase the likelihood that a foreign key estimate based on SetSketch probabilistic data structures is indeed a foreign key candidate. These other criteria include $|A \cap B|$ (i.e., the number of distinct elements that appear in A and B), $|B|$ (the number of distinct elements in B), the inclusion coefficient, and the Jaccard similarity J ($|A \cap B|$)/($|A \cup B|$). These values can optionally be used to reject foreign key estimates that fulfill the necessary condition B\A=0 or to select one foreign key estimate in cases where multiple potential foreign key estimates are available for one column B (i.e., if B could be a foreign key candidate for multiple different primary key candidates Ax) or both.

In the subsequent paragraphs we distinguish between foreign key candidates based on the actual data and foreign key estimates based on SetSketch probabilistic data structures.

In this document, both foreign key candidates and estimated foreign key estimates are identified by evaluating the inclusion coefficient $\Phi$ between two columns. The notation $\Phi(B.C_2, A.C_1)$ denotes the inclusion coefficient between the column C2 of table B and the column C1 of table A. The column C2 of table B is considered to be a foreign key candidate or foreign key estimate in relation to column C1 of table A if the inclusion coefficient is greater or equal to a threshold t, i.e. $\Phi(B.C_2, A.C_1) \geq t$. It is noted that generally inclusion coefficients are asymmetric, i.e. that the order of arguments is important $\Phi(A.C_1, B.C_2) \neq \Phi(B.C_2, A.C_1)$.

In a first step, let us find foreign key candidates in the table B for column 1 of table A. As noted above, the first column of table A (short A.C1) contains 12 distinct elements, namely {1, 2, 3, 4, 5, 6, 7, 8, 9, 10, 11, 12}. In order to find the foreign key candidates in table B, we start with the $1^{st}$ column of table B: B.C1 comprises just 1 distinct element, namely {1}. The inclusion coefficient between B.C1 and A.C1, $\Phi(B.C_1, A.C_1)$, is defined either as $$\Phi(B.C_1, A.C_1) = \frac{|B.C_1 \cap A.C_1|}{|B.C_1|} \text{ or } \Phi(B.C_1, A.C_1) = \frac{(|B.C_1| + |A.C_1|)J}{|B.C_1|(1 + J)}$$

with J being the Jaccard similarity $$J = \frac{|B.C_1 \cap A.C_1|}{|B.C_1 \cup A.C_1|}.$$

We start with using the first formulation: The intersection between B.C1 and A.C1 is {1} and B.C1 is {1}. Thus $$\Phi(B.C_1, A.C_1) = \frac{|B.C_1 \cap A.C_1|}{|B.C_1|} = \frac{1}{1} = 1.$$

The second formulation using the Jaccard similarity is equivalent, which will be shown briefly. The Jaccard similarity $$J = \frac{|B.C_1 \cap A.C_1|}{|B.C_1 \cup A.C_1|} = \frac{|\{1\}|}{|\{1, 2, 3, 4, 5, 6, 7, 8, 9, 10, 11, 12\}|} = \frac{1}{12}.$$

Thus $$\Phi(B.C_1, A.C_1) =$$

$$\frac{(|B.C_1| + |A.C_1|)J}{|B.C_1|(1 + J)} = \frac{(|\{1\}| + |\{1, 2, 3, 4, 5, 6, 7, 8, 9, 10, 11, 12\}|}{12|\{1\}|\left(1 + \frac{1}{12}\right)} = 1.$$

Both formulations for the inclusion coefficient between col. 1 of table B and col. 1 of table A, $\Phi(B.C_1, A.C_1)$, yield that B.C1 is a foreign key candidate for A.C1. The same result is given for columns 2 and 3 of table B, as these columns are also foreign key candidates for A.C1. Let us check col. 4 of table B for completeness. We again start with the first formulation. The intersection between $B.C_4$ and A.C1 is {1} and $B.C_4$ is {1, 13, 14, 15, 16, 1, 18, 19, 20, 21, 1, 23}. Thus $$\Phi(B.C_1, A.C_1) = \frac{|B.C_1 \cap A.C_1|}{|B.C_1|} = \frac{1}{10} = 0.1.$$

The second formulation using the Jaccard similarity should deliver the same result. The Jaccard similarity $$J = \frac{|B.C_4 \cap A.C_1|}{|B.C_4 \cup A.C_1|} = \frac{|\{1\}|}{|\{1, 2, 3, 4, 5, 6, 7, 8, 9, 10, 11, 12, 13, 14, 15, 16, 18, 19, 20, 21, 23\}|} = \frac{1}{21}.$$

Thus $\Phi(B.C_4, A.C_1) = \frac{(|B.C_4| + |A.C_1|)J}{|B.C_4|(1 + J)} = \frac{(10 + 12)}{21 * 10 * \left(1 + \frac{1}{21}\right)} = 0.1.$ Both formulations for the inclusion coefficient $\Phi(B.C_4, A.C_1)$ yield the same result. In total, columns 1-3 are foreign key candidates for column 1 of table A, whereas B.C4 is not.

Let us briefly investigate the opposite case, i.e. if based on column 1 of table B column 1 of table A is a foreign key candidate. Starting again with the $1^{st}$ formulation yields, $$\Phi(A.C_1, B.C_1) = \frac{|A.C_1 \cap B.C_1|}{|A.C_1|} = \frac{1}{12}.$$

The second formulation using the Jaccard similarity yields $$J = \frac{|B.C_1 \cap A.C_1|}{|B.C_1 \cup A.C_1|} = \frac{|\{1\}|}{|\{1, 2, 3, 4, 5, 6, 7, 8, 9, 10, 11, 12\}|} = \frac{1}{12}.$$

$$\text{Thus } \Phi(A.C_1, B.C_1) = \frac{(|A.C_1| + |B.C_1|)J}{|A.C_1|(1 + J)} = \frac{(12 + 1)}{12 * 12 * \left(1 + \frac{1}{12}\right)} = \frac{1}{12}.$$

Therefore it is shown that the inclusion coefficient is indeed asymmetric, i.e. $\Phi(A,B) \neq \Phi(B,A)$.

The real inclusion coefficients, i.e. the inclusion coefficients based on real data (not estimates), are also given below:

Tab. 5 Values of real inclusion coefficients

| Inclusion coefficient | Value of inclusion coefficient (real) |
|---|---|
| $\Phi(B.C_1, A. C_1)$ | 1 |
| $\Phi(A.C_1, B. C_1)$ | 0.08 |
| $\Phi(B.C_2, A. C_1)$ | 1 |
| $\Phi(B.C_3, A.C_1)$ | 1 |
| $\Phi(B.C_4, A.C_1)$ | 0.1 |

Instead of accurately determining whether a column of a table is a foreign key candidate relative to another column, foreign key estimates are based on SetSketch data structures. As a SetSketch probabilistic data structure is an estimate, these are called foreign key estimates.

The Java code for calculating cardinality estimates, the Jaccard similarity and the inclusion coefficient between column 1 of table B and the $1^{st}$ column of table A in order to determine whether B.C1 is a foreign key estimate for A.C1 is:

```
public static void main(String[ ] args) {
// Defining A.C1
int[ ] AC1 = new int[ ]{1, 2, 3, 4, 5, 6, 7, 8, 9, 10, 11,
12};
// Defining B.C1
int[ ] BC1 = new int[ ]{1, 1, 1, 1, 1, 1, 1, 1, 1, 1, 1,
1};
// Creating a SetSketch for A.C1
SetSketch sketchAC1 = SetSketch.createFromBulk(AC1);
// Creating a SetSketch for B.C1
SetSketch sketchBC1 = SetSketch.createFromBulk(BC1);
// Cardinality estimates for B.C1 and A.C1
double cardB = sketchBC1.cardinality( );
double cardA = sketchAC1.cardinality( );
// Jaccard similarity between B.C1 and A.C1
double J = sketchBC1.calculateSimilarity(sketchAC1);
System.out.println("Jaccard similarity J between
SetSketch for B.C1 and SetSketch for A.C1: J = " + J);
// Inclusion coefficient between B.C1 and A.C1
double Phi = ((cardB+cardA)*J)/(cardB*(1+J));
System.out.println("Inclusion coefficient Phi between
B.C1 and A.C1: Phi = " + Phi);
}
```

Running the above code yields that the estimated inclusion coefficient Phi=$\Phi(B.C_1, A.C_1)$ is 0.998, hence assuming a threshold t=0.9 yields that B.C1 is a foreign key estimate for A.C1. The same holds true for B.C2 and B.C3. The next interesting case is whether B.C4. Analyzing this yields an estimated Phi=$\Phi(B.C_4, A.C_1)$ is 0.11, hence assuming a threshold t=0.9 yields that B.$C_4$ is no foreign key estimate for A.C1.

The real and estimated inclusion coefficients between table B and the $1^{st}$ column of table A are given below:

Tab. 6 Real and estimated inclusion coefficients between table B and A.C1

| Formula | Inclusion coefficient based on real data | Inclusion coefficient based on SetSketch estimates |
|---|---|---|
| $\Phi(B.C_1, A. C_1)$ | 1 | 0.998 |
| $\Phi(B.C_2, A. C_1)$ | 1 | 0.998 |
| $\Phi(B.C_3, A. C_1)$ | 1 | 0.998 |
| $\Phi(B.C_4, A. C_1)$ | 0.1 | 0.11 |
| $\Phi(A.C_1, B.C_1)$ | 0.08 | 0.0831 |
| $\Phi(A.C_1, B. C_2)$ | 0.5 | 0.49999 |
| $\Phi(A.C_1, B. C_3)$ | 1 | 0.9998 |
| $\Phi(A.C_1 B.C_4)$ | 0.08 | 0.0915 |

Let us investigate one further interesting case: Assume that we want to find foreign key estimates in table B for column 4 of table A. Analyzing B.C1 first yields Phi=0.9996, analyzing B.C2 first yields Phi=0.5, analyzing B.C3 first yields Phi=0.25, and analyzing B.C4 yields Phi=0.1. Assuming t=0.9, only B.C1 is identified as foreign key estimate for A.$C_4$.

Instead of using the Jaccard similarity to compute the inclusion coefficient, the inclusion coefficient $$\Phi(B.C_4, A.C_1) = \frac{|B.C_4 \cap A.C_1|}{|B.C_4|}$$

can be calculated using the intersection of two sets or relations. According to the inclusion-exclusion principle, the following condition holds: $|A \cap B| = |A| + |B| - |A \cup B|$. In other words, the cardinality of the intersection of two sets is the sum of the cardinalities of the sets minus the cardinality of the union of the sets. The code for calculating the inclusion coefficient $\Phi(B.C_4, A.C_1)$ is:

```
SetSketch sketchMerged =
SetSketch.merge(sketchBC4,sketchAC4);
inter = cardA + cardB − sketchMerged.cardinality( );
Phi = inter/cardB;
```

In the first line of code, a new SetSketch is generated by merging the sketches for B.C4 and A.C4. In the second line, the cardinality of the intersection is computed applying the inclusion-exclusion principle. Finally, the inclusion coefficient Phi is calculated. Doing this yields the same results as using the Jaccard similarity for computing the inclusion coefficient.

In a third application example the steps for supporting a user or method customer in formulating join queries will be explained. Assume that a user wants to formulate a join query in a database system using a syntax similar to SQL. E.g., the tables A and B shall be joined if entries in the relevant columns of the tables fulfil a join condition. In case of the example, only those data records shall be joined where an entry in column Ci of table A matches the entry in column Cj of table B. The term "A.Ci=B.Cj" constitutes the join condition. A SQL query for that could read:

```
SELECT *
FROM A, B
WHERE A.Ci = B.Cj;
Join query 1
```

By utilizing the tables A and B (see Tab. 1 and Tab. 4) as above, the results of the $1^{st}$ and $2^{nd}$ application examples can be reused.

Let us further assume that the user has no or limited knowledge about the data, here the tables A and B, and/or the size of the data is big. In such or other cases, it is beneficial to support the user in proposing columns of the tables for formulating the join condition. According to the disclosure, this is done as follows:

Assuming that the user or method customer has already input the first two lines and the keyword "WHERE" of the join query indicating to the computer processor that the join condition is going to be entered next. More specifically, let us assume that the user wants to join tables A and B and that the joined table shall comprise all columns. For that, the first part of the join query could read "SELECT*FROM A, B WHERE".

After inputting the first part of the join query, the processor expects the join condition to be entered and is supporting the user/method customer in doing so. The first part of the join condition defining the first table is entered by the user. Let us assume that the user types in the name of the first table, say "A". Following that, the user enters a separator separating the name of the table from the name of the column. Let us assume that the separator is simply a dot, i.e. ".". After this, the user is presented with the columns of the first table, thus six columns "Col 1" to "Col 6" of table A are presented to the user for entry or selection. This is straightforward as the names/nominations of the columns are known.

As the tables A and B are generally known before formulating the join query, these tables can be analyzed beforehand. Specifically, SetSketch probabilistic data structure can be generated for the individual columns of these tables. Depending on the amount of data, generating SetSketches can be done in advance or even on the fly, i.e. at the time of inputting the join query. Note that even when using standard parameters for a SetSketch, a column is represented by approx. 8 kB of data, which is very small considering that a SetSketch can hold up to $10^{18}$ distinct elements. Based on the SetSketches and the number of rows of the tables, the cardinalities of the columns, and the ratios r for determining primary key candidate estimates can be calculated either in advance or online.

In addition to outputting the names of the columns, the columns being primary key estimates of the first table A are highlighted, e.g. by displaying them first in a list of columns, say "C1; C2; C3; C4; C5; C6". Instead of changing the order of columns and/or in addition to it, primary key estimates can be displayed bold, a different color, say blue, etc. According to another alternative, the columns of the first table are displayed according to the order of ration r and columns having a r≥t are printed bold and/or in a separate color. In FIG. 4 the columns of table A are shown and the column being a primary key estimate is printed bold. The other columns are printed non-bold and light grey. The user can choose any column by selecting it either by a mouse, the keyboard etc. According to the depicted status, the user would be able to select A.C2 (see grey box indicating the current focus).

Next, the user selects a column of table A, e.g. by selecting the name of the column by a pointing device, by selecting it on a touch screen or by typing in the name of the column. Let us assume that column 1 of table A A.C1 is selected. After having selected the column of the $1^{st}$ table, the user or method customer inputs a logical operator, e.g. the equality operator "=".

The user inputting the name of the second table, say "B" for table B, follows next, immediately followed by the input of a separator, say ".". Doing so, the columns of the second table, i.e. columns "C1" to "C4" of table B, are displayed to the user for entry or selection. Again, this is straight-forward as the names/nominations of the columns are known.

Instead of just outputting the names of the columns of the second table, the columns of table B can are presented in descending order according to the inclusion coefficient $\Phi$ between the columns of table B and the columns of table A, i.e. $\Phi(B.Cj, A.Ci)$. Instead or in addition to that, columns being foreign key estimates can be outputted bold, another color etc. In FIG. 5 the columns C1-C3 of table B are printed bold as they are foreign key estimates relative to A.C1, whereas C4 is printed grey.

However, as the join condition typically involves the equality sign "=" as logical operator between two columns of distinct tables, using just one inclusion coefficient $\Phi(B.Cj, A.Ci)$ between one column of table B and one column of table A may be confusing for some users. This is due to the fact that the equality operator is symmetric, i.e. it does not matter whether one writes a=b or b=a, whereas the inclusion coefficient is asymmetric, i.e. $\Phi(A,B) \neq \Phi(B,A)$. According to a preferred embodiment, not just a first inclusion coefficient $\Phi(B.Cj, A.Ci)$ is calculated and displayed but also a reversed second inclusion coefficient $\Phi(A.Ci, B.Cj)$ is calculated. The first inclusion coefficient $\Phi(B.Cj, A.Ci)$ is decisive if column j of table B is a foreign key candidate for column i of table A. The second inclusion coefficient $\Phi(A.Ci, B.Cj)$ is decisive if column i of table A is a foreign key candidate for column j of table B.

This is shown in FIG. 6. In the first box adjacent to the letter B representing the $2^{nd}$ table and the separator, the columns of table B are printed bold where these columns are foreign key estimates for A.C1. In the second box located on the right-hand side of the first box, the columns of the table B are printed bold where A.C1 is a foreign key estimate for the respective column in table B.

After having discussed three rather simple application examples, a fourth application example will be presented based on the so-called IMDB (Internet Movie Data Base) dataset. The dataset was downloaded from http://homepages.cwi.nl/~boncz/job/imdb.tgz and constitutes the complete IMDB dataset from May 2013. Due to the size and complexity of the data set, this data set has already been used multiple times for different types of analysis (see e.g. https://github.com/gregrahn/join-order-benchmarkl.

In this application example, the tables keyword and movie_keyword shall be joined according to a sensible join condition. Subsequently it will be assumed that the user does not know the data tables well, in particular that he is not aware of primary and foreign keys in the data.

Note that the table "keyword" comprises three columns, namely id, keyword, and phonetic_code, and 134,170 rows, and the table "movie_keyword" comprises also three columns, namely id, movie_id, keyword_id, and 4,523,930 rows (see FIG. 7 showing the structure of the tables keyword and movie_keyword). The size of the table "keyword" is 4 MB, and the size of the table "movie_keyword" is 89 MB (all represented as CSV files). Already by looking at this data, it is apparent that exact solutions require a lot of memory and CPU load. That's why probabilistic data structures, such as sketches, in particular SetSketches, are useful.

In order to conduct the analysis of primary and foreign key estimates, the methods defined above and the following Java code is used:

```
public static void main(String[ ] args) {
// SetSketches for columns of table k
SetSketch k_id = SetSketch.createDefault( );
SetSketch k_keyword = SetSketch.createDefault( );
SetSketch k_phonetic_code = SetSketch.createDefault( );
// Cardinality estimates for columns of table k
long card_k_id, card_k_keyword, card_k_phonetic_code;
// Ratios r
float r_k_id, r_k_keyword, r_k_phonetic_code;
// Threshold t
float t = 0.9f;
// Counter
int n = 0;
// Reading in table keyword and construct 3 SetSketches
try (BufferedReader reader = new BufferedReader(new
FileReader("./data/keyword.csv"))) {
    String line;
    while ((line = reader.readLine( )) != null) {
        String[ ] parts = line.split(",");
        n = n+1;
        k_id.add(parts[0]);
        k_keyword.add(parts[1]);
        k_phonetic_code.add(parts[2]);
    }
} catch (IOException e) {
    throw new RuntimeException(e);
}
// Calculate cardinality estimates
card_k_id = k_id.cardinality( );
card_k_keyword = k_keyword.cardinality( );
card_k_phonetic code = k_phonetic_code.cardinality( );
// Calculate r
r_k_id = card_k_id/(float) n;
k_keyword = card_k_keyword/(float) n;
rk_phonetic_code = card_k_phonetic_code/(float) n;
System.out.println("=== Data for k.csv ===");
System.out.println("Number of rows of k = " + n + "\n");
System.out.println("Cardinality k.id = " + card_k_id);
if(r_k_id >= t)
        System.out.println("k.id is a primary key
candidate!\n");
System.out.println("Cardinality k.keyword = " +
card_k_keyword);
if(r_k_keyword >= t)
        System.out.println("k.keyword is a primary key
candidate!\n");
System.out.println("Cardinality k.phonetic_code = " +
card_k_phonetic_code);
if(r_k_phonetic_code >= t)
        System.out.println("k.phonetic_code is a primary
key candidate!\n");
/// SetSketches for the columns of table mk
SetSketch mk_id = SetSketch.createDefault( );
SetSketch mk_movie_id = SetSketch.createDefault( );
SetSketch mk_keyword_id = SetSketch.createDefault( );
// Cardinality estimates for columns of table mk
long card_mk_id, card_mk_movie_id, card_mk_keyword_id;
n = 0;
// Reading in table movie_keyword and construct
SetSketches
try (BufferedReader reader = new BufferedReader(new
FileReader("./data/movie_keyword.csv"))) {
    String line;
    while ((line = reader.readLine( )) != null) {
        String[ ] parts = line.split(",");
        n = n+1;
        mk_id.add(parts[0]);
        mk_movie_id.add(parts[1]);
        mk_keyword_id.add(parts[2]);
    }
} catch (IOException e) {
    throw new RuntimeException(e);
}
// Calculate cardinality estimates
card_mk_id = mk_id.cardinality( );
card_mk_movie_id = mk_movie_id.cardinality( );
card_mk_keyword_id = mk_keyword_id.cardinality( );
System.out.println("\n=== Data for mk.csv ===");
System.out.println("Number of rows of mk = " + n + "\n");
System.out.println("Cardinality mk.id = " + card_mk_id);
System.out.println("Cardinality mk.movie_id = " +
```

```
card_mk_movie_id);
System.out.println("Cardinality mk.keyword_id = " +
card_mk_keyword_id);
System.out.println("\n=== Similarities between k and mk
===");
// Inclusion coefficient between k.id and mk.id based on
Jaccard similarity
double J = k_id.calculateSimilarity(mk_id);
double Phi1 =
((card_k_id+card_mk_id)*J)/(card_mk_id*(1+J));
System.out.println ("Inclusion coefficient Phi between
mk.id and k.id: Phi = " + Phi1);
double Phi2 =
((card_k_id+card_mk_id)*J)/(card_k_id*(1+J));
System.out.println("Inclusion coefficient Phi between
k.id and mk.id: Phi = " + Phi2);
if (Phi1 >= t || Phi2 >= t)
    System.out.println("mk.id is a foreign key estimate
for candidate for k.id or vice versa!");
System.out.println( );
// Inclusion coefficient between k.id and mk.movie_id
based on Jaccard similarity
J = k_id.calculateSimilarity(mk_movie_id);
Phi1 =
((card_k_id+card_mk_movie_id)*J)/(card_mk_movie_id*(1+J))
;
System.out.println("Inclusion coefficient Phi between
mk.id and k.id: Phi = " + Phi1);
Phi2 =
((card_k_id+card_mk_movie_id)*J)/(card_k_id*(1+J));
System.out.println("Inclusion coefficient Phi between
k.id and mk.id: Phi = " + Phi2);
if(Phi1 >= t || Phi2 >= t)
    System.out.println("mk.movie_id is a foreign key
estimate for candidate for k.id or vice versa!");
System.out.println( );
// Inclusion coefficient between k.id and mk.keyword_id
based on Jaccard similarity
J = k_id.calculateSimilarity(mk_keyword_id);
Phi1 =
((card_k_id+card_mk_keyword_id)*J)/(card_mk_keyword_id*(1
+J));
System.out.println("Inclusion coefficient Phi between
mk.id and k.id: Phi = " + Phi1);
Phi2 =
((card_k_id+card_mk_keyword_id)*J)/(card_k_id*(1+J));
System.out.println("Inclusion coefficient Phi between
k.id and mk.id: Phi = " + Phi2);
if (Phi1 >= t || Phi2 >= t)
    System.out.println("mk.keyword_id is a foreign key
estimate for candidate for k.id or vice versa!");
System.out.println( );
}
```

Let us now explain the analysis steps performed in the code: First, three SetSketches, k_id, k_keyword and k_phonetic_code, are generated using the default parameters for a SetSketch, i.e. 4096 registers having 16-bit each, a basis of 1.001 and a rate of 20. After defining variables for the cardinalities, the ratios and the threshold the data from the table keyword.cvs is read-in and added to the respective SetSketches. Then, the cardinality estimates for the three columns and the ratios r are calculated, yielding that the $1^{st}$ and the $2^{nd}$ column of table k are primary key estimates, whereas the third column is no primary key estimate. After this, three more SetSketches, mk_id, mk_movie_id and mk_keyword_id, are generated for the columns of the table movie_keyword.cvs using default parameters, and the data from the table is read-in and added to the respective SetSketches.

The output from the first part of the Java code is:

```
=== Data for k.csv ===
Number of rows of k = 134170
Cardinality k.id = 132806
k.id is a primary key candidate!
Cardinality k.keyword = 135901
k.keyword is a primary key candidate!
Cardinality k.phonetic__code = 15590
=== Data for mk.csv ===
Number of rows of mk = 4523930
Cardinality mk.id = 4415720
Cardinality mk.movie__id = 479254
Cardinality mk.keyword__id = 132806
```

FIG. 8 shows a screenshot of the interface after the first steps in the formulation of a join condition have been performed. The first part of the join query "SELECT*FROM keyword AS k, movie_keyword AS mk WHERE k." is already entered into the computer. In response to this partial join query, the computer prints the columns of the table k and prints those columns bold, here k.id and k.keyword, that are considered primary key estimates based on the primary key detection.

Applying the computer-implemented method for determining primary key estimates yields the results printed above, such that the columns k.id and k.keyword are printed bold in FIG. 8 as these columns are considered primary key estimates. It is assumed that the user selects k.id as the column of the table keyword he wants to join using a join condition to be specified.

Continuing the execution of the Java code, yields the following output:

```
=== Similarities between k and mk ===
Inclusion coefficient Phi between mk.id and k.id: Phi =
0.029883636379807694
Inclusion coefficient Phi between k.id and mk.id: Phi =
0.9936130207599388
mk.id is a foreign key estimate for candidate for k.id or
vice versa!
Inclusion coefficient Phi between mk.id and k.id: Phi =
0.023609959598965374
Inclusion coefficient Phi between mk.id and k.id: Phi =
0.0852007257024724
Inclusion coefficient Phi between mk.id and k.id: Phi =
0.999816682041721
Inclusion coefficient Phi between mk.id and k.id: Phi =
0.999816682041721
mk.keyword__id is a foreign key estimate for candidate for
k.id or vice versa!
```

Code execution yields the following inclusion coefficients:

Tab. 7 Estimated inclusion coefficients between tables k and mk

| Formula | Inclusion coefficient based on SetSketch estimates |
|---|---|
| $\Phi$(mk.id, k.id) | 0.0299 |
| $\Phi$(mk.movie__id, k.id) | 0.0236 |
| $\Phi$(mk.keyword__id, k.id) | 0.9998 |
| $\Phi$(k.id, mk.id) | 0.9936 |
| $\Phi$(k.id, mk.movie__id) | 0.0852 |
| $\Phi$(k.id, mk.keyword__id) | 0.9998 |

Note that the last three inclusion coefficients are purely optional, as they are used to answer the question whether k.id is a foreign key estimate for mk.id, mk.movie_id and mk.keyword_id.

After having selected k.id by a pointing device or a keyboard, the formulation of the join query continues, and the user enters the logical operator "=" as part of the join condition. After this, the user enters the second table mk to be joined to the first table k. Applying the computer-implemented method for determining foreign key estimates relative to k.id yields the results in Tab. 7 above, such that the column mk.keyword_id is printed bold in FIG. 9 as it is a foreign key estimate relative to k.id.

As it sometimes makes sense not just to compute the inclusion coefficient $\Phi$(A,B) but also the inclusion coefficient $\Phi$(B,A), the result of this case is displayed in FIG. 10 where these "secondary" inclusion coefficients are printed on the right-hand side of the primary inclusion coefficients. As k.id is a foreign key estimate relative to mk.id and mk.keyword_id, these columns are printed bold.

Given this information about foreign key estimates, the user selects the column of table mk he wants to join with k.id. Particularly for not well-known data and/or large data, the disclosed methods for primary key detection and foreign key detection are very helpful for the user in formulating database queries. By doing so, the time and CPU intensive work of joining wrong columns can be avoided or at least greatly reduced.

The utilization of SetSketches as a probabilistic data structure is very beneficial since one type of sketch can be used to accurately detect both primary key estimates and foreign key estimates. The generation of SetSketches is very fast, and the estimation of cardinalities and similarities is very efficient too.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for determining primary keys in a table of a database system, comprising:
  determining, by a computer processor, a number of rows in the table;
  for a given column of the table, generating, by the computer processor, a probabilistic data structure for the given column, where the probabilistic data structure is partitioned into a plurality of registers and configuration parameters for the probabilistic data structure includes a first recording parameter, base, that controls recording of data into the probabilistic data structure, wherein the probabilistic data structure is updated in accordance with the first recording parameter and a second recording parameter, rate, such that changing a value of the first recording parameter and changing the number of registers sets maximum number of distinct data elements that can be represented by the probabilistic data structure;
  computing, by the computer processor, a cardinality estimate for the given column using the probabilistic data structure;
  computing, by the computer processor, a ratio between the cardinality estimate for the given column and the number of rows in the table;

comparing, by the computer processor, the ratio to a threshold; and
  designating the given column as a primary key for the table in response to the ratio being greater than the threshold.

2. The method of claim 1 wherein the probabilistic data structure is SetSketch data structure.

3. The method of claim 1 further comprises repeating the steps for each column of the table.

4. A computer-implemented method for joining tables in a database system, comprises:
  receiving, by a computer processor, an indicator for a first table to be joined;
  determining, by the computer processor, a given column of the first table as a primary key;
  receiving, by the computer processor, a join operation for joining the first table with a second table in the database system, where the join operation is based on the given column from the first table;
  determining foreign keys in the second table relative to the given column designated in the first table of a database system; and
  joining, by the computer processor, the first table with the second table according to the join operation and using the foreign keys;
  wherein the given column of the first table is determined to be a primary key by determining, by a computer processor, a number of rows in the table;
  for a given column of the table, generating, by the computer processor, a probabilistic data structure for the given column, where the probabilistic data structure is partitioned into a plurality of registers and configuration parameters for the probabilistic data structure includes a first recording parameter, base, that controls recording of data into the probabilistic data structure;
  computing, by the computer processor, a cardinality estimate for the given column using the probabilistic data structure;
  computing, by the computer processor, a ratio between the cardinality estimate for the given column and the number of rows in the table;
  comparing, by the computer processor, the ratio to a threshold; and
  designating the given column as a primary key for the table in response to the ratio being greater than the threshold; and
wherein the foreign keys in the second table are determined by:
  for a first column of the second table, generating, by the computer processor, another probabilistic data structure for the first column, where the another probabilistic data structure is partitioned into a plurality of registers and configuration parameters for the another probabilistic data structure includes a first recording parameter, base, that controls recording of data into the another probabilistic data structure;
  computing, by the computer processor, a cardinality estimate for the first column using the another probabilistic data structure;
  computing, by the computer processor, an inclusion coefficient between the first column of the second table relative to the given column of the first table based in part on the cardinality estimate for the first column;
  comparing, by the computer processor, the inclusion coefficient to a threshold; and designating the first column of the second table as a foreign key in response to the inclusion coefficient being greater than the threshold.

5. A computer-implemented method for formulating a join operation in a database system, comprising:

receiving, by a computer processor, an indicator for a first table to be joined;

determining, by the computer processor, a given column of the first table as a primary key by determining, by a computer processor, a number of rows in the table;

for a given column of the table, generating, by the computer processor, a probabilistic data structure for the given column;

computing, by the computer processor, a cardinality estimate for the given column using the probabilistic data structure;

computing, by the computer processor, a ratio between the cardinality estimate for the given column and the number of rows in the table;

comparing, by the computer processor, the ratio to a threshold;

designating the given column as a primary key for the table in response to the ratio being greater than the threshold;

determining, by the computer processor, foreign keys in a second table relative to the given column designated in the first table, where the determination is based in part on the probabilistic data structure;

receiving, by the computer processor, a join operation for joining the first table with the second table in the database system using the foreign keys; and joining, by the computer processor, the first table with the second table according to the join operation;

wherein determining foreign keys in the second table comprised:

for a first column of the second table, generating, by the computer processor, another probabilistic data structure for the first column, where the another probabilistic data structure is partitioned into a plurality of registers and configuration parameters for the another probabilistic data structure includes a first recording parameter that controls recording of data into the another probabilistic data structure;

computing, by the computer processor, a cardinality estimate for the first column using the another probabilistic data structure;

computing, by the computer processor, an inclusion coefficient between the first column of the second table relative to the given column of the first table based in part on the cardinality estimate for the first column;

comparing, by the computer processor, the inclusion coefficient to a threshold; and designating the first column of the second table as a foreign key in response to the inclusion coefficient being greater than the threshold.

6. The method of claim 5 wherein determining foreign key in the second table includes generating another probabilistic data structure for a column of the second table, such that the determination is based on the probabilistic data structure and the another probabilistic data structure.

7. The method of claim 6 wherein the another probabilistic data structure is same type and has same structure as the probabilistic data structure.

8. The method of claim 5 further comprises computing, by the computer processor, an inclusion coefficient $\Phi(B.C_j, A.C_i)$ between the first column of the second table $B.C_j$ relative to the given column of the first table $A.C_i$, where the inclusion coefficient iS defined as $\Phi(B.C_j, A.C_i)=(|B.C_j|+|A.C_i|)J/|B.C_j|(1+J)'$, where $|B.C_j|$ is the cardinality estimate for the first column of the second table, $|A.C_i|$ is the cardinality of the given column of the first table, and J is Jaccard similarity between the first column of the second table and the given column of the first table.

9. The method of claim 5 wherein the inclusion coefficient is defined as $$\Phi(B.C_j, A.C_i) = \frac{|B.C_j \cap A.C_i|}{|B.C_j|},$$

where the cardinality of the intersection between $B.C_j$ and $A.C_i$, $|B.C_j \cap A.C_i|$, is calculated using the inclusion-exclusion principle.

10. The method of claim 5 further comprises determining foreign keys in the first table relative to the first column in the second table by computing, by the computer processor, an inclusion coefficient between the given column of the first table relative to the first column of the second table based in part on the cardinality estimate for the first column and the cardinality estimate for the given column;

comparing, by the computer processor, the inclusion coefficient to a threshold; and designating the given column of the first table as a foreign key in response to the inclusion coefficient being greater than the threshold.

11. The method of claim 10 further comprises computing, by the computer processor, an inclusion coefficient is defined as $\Phi(A.C_i, B.C_j)=(|A.C_i|+|B.C_j|)J/|A.C_i|(1+J)$, where $|A.C_i|$ is the cardinality estimate for the given column of the first table, $|B.C_j|$ is the cardinality of the first column of the second table, and J is Jaccard similarity between the first column of the second table and the given column of the first table.

12. The method of claim 10 wherein the inclusion coefficient is defined as $$\Phi(B.C_j, A.C_i) = \frac{|B.C_j \cap A.C_i|}{|B.C_j|},$$

where the cardinality of the intersection between $A.C_i$ and $B.C_j$, $A.C_i \cap B.C_j|$, is calculated using the inclusion-exclusion principle.

* * * * *